(12) United States Patent
Tsai et al.

(10) Patent No.: US 7,314,586 B2
(45) Date of Patent: Jan. 1, 2008

(54) METHOD FOR MANUFACTURING A WAX MOLD FOR A GOLF CLUB HEAD

(75) Inventors: Liang-Ho Tsai, Kaohsiung (TW); Che-Ming Yu, Kaohsiung (TW); Ying-Sen Hsu, Kaohsiung (TW)

(73) Assignee: Advanced International Multitech Co., Ltd., Kaohsiung (TW)

( * ) Notice: Subject to any disclaimer, the term of this patent is extended or adjusted under 35 U.S.C. 154(b) by 550 days.

(21) Appl. No.: 10/910,966

(22) Filed: Aug. 2, 2004

(65) Prior Publication Data

US 2005/0140050 A1    Jun. 30, 2005

(30) Foreign Application Priority Data

Dec. 24, 2003    (TW) ............................... 92136682 A

(51) Int. Cl.
 B29C 45/14    (2006.01)
 B29C 45/16    (2006.01)
(52) U.S. Cl. .................. 264/227; 264/255; 264/313
(58) Field of Classification Search .............. None
 See application file for complete search history.

(56) References Cited

U.S. PATENT DOCUMENTS

| 4,472,092 A * | 9/1984 | Schmidt ............... 164/35 |
| 5,204,046 A * | 4/1993 | Schmidt ............... 264/328.1 |
| 5,577,550 A * | 11/1996 | Schmidt ............... 164/516 |
| 6,406,654 B1 * | 6/2002 | Perez et al. ........... 264/225 |
| 6,830,093 B2 * | 12/2004 | Bramley ............... 164/34 |
| 2003/0116300 A1 * | 6/2003 | Bramley ............... 164/35 |
| 2005/0258568 A1 * | 11/2005 | Hou ..................... 264/225 |

FOREIGN PATENT DOCUMENTS

JP    2005-312781    * 11/2005

* cited by examiner

Primary Examiner—Edmund H. Lee
(74) Attorney, Agent, or Firm—James H. Walters

(57) ABSTRACT

A method for manufacturing a wax mold of a golf club head includes steps of positioning a male die assembly in a first cavity of a first female die, injecting dissolvable wax into the first cavity to form a dissolvable wax mold, removing the first female die to take out the solidified dissolvable wax mold, positioning the dissolvable wax mold and the male die assembly in a second cavity of a second female die, injecting wax for precision casting into the second cavity to form a head wax mold, removing the second female die to take out the solidified head wax mold, and injecting solvent into the head wax mold to dissolve the dissolvable wax mold.

2 Claims, 3 Drawing Sheets

METHOD FOR MANUFACTURING A WAX MOLD FOR A GOLF CLUB HEAD

BACKGROUND OF THE INVENTION

1. Field of the Invention

The present invention relates to a method for manufacturing a wax mold for a golf club head, and more particularly to a manufacturing method which has a low cost with a small quantity of male dies by utilizing dissolvable wax.

2. Description of Related Art

The golf club head generally has a very complex and irregular shape, which is inconvenient and difficult to cast the head. A conventional manufacturing method uses two matched female dies defining a cavity between the two dies. The cavity has an inner wall corresponding to a contour of a golf club head. A male die assembly is composed of multiple male dies and positioned in the cavity. A clearance equal to a thickness of the golf club head is between the male die assembly and the inner wall of the cavity. Wax for precision casting is injected in the clearance to form a wax mold of the golf club head. Then, the male dies are in turn removed from the wax mold.

However, for being conveniently removed from the intact wax mold, the male dies must be designed with special pattern drafts according to the shape of the golf club head. For the golf club head with a complex shape, it is difficult to design the male dies with proper pattern drafts. Furthermore, due to the large number of male dies, the manufacturing cost for the wax mold is high and the process to remove the male dies is time-consuming. Moreover, it is also difficult to control the precision of the wax mold made by these male dies.

Therefore, the invention provides a manufacturing method for a wax mold of a golf club head to mitigate or obviate the aforementioned problems.

SUMMARY OF THE INVENTION

The main objective of the present invention is to provide a method for manufacturing a wax mold for casting a golf club head which can reduce a manufacturing cost and improve a product quality of the golf club head.

Other objectives, advantages and novel features of the invention will become more apparent from the following detailed description when taken in conjunction with the accompanying drawings.

DETAILED DESCRIPTION OF THE PREFERRED EMBODIMENT

FIGS. 1A-G illustrate a process to manufacture a wax mold of a golf club head in accordance with the present invention.

Figure 1C:
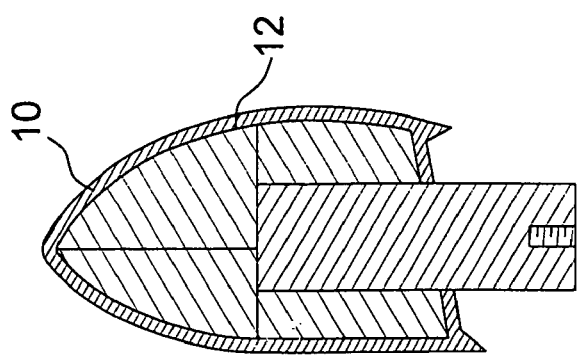
FIG. 1A-G are schematic views showing a process to manufacture a wax mold of a golf club head in accordance with the present invention.
Figure 1B:
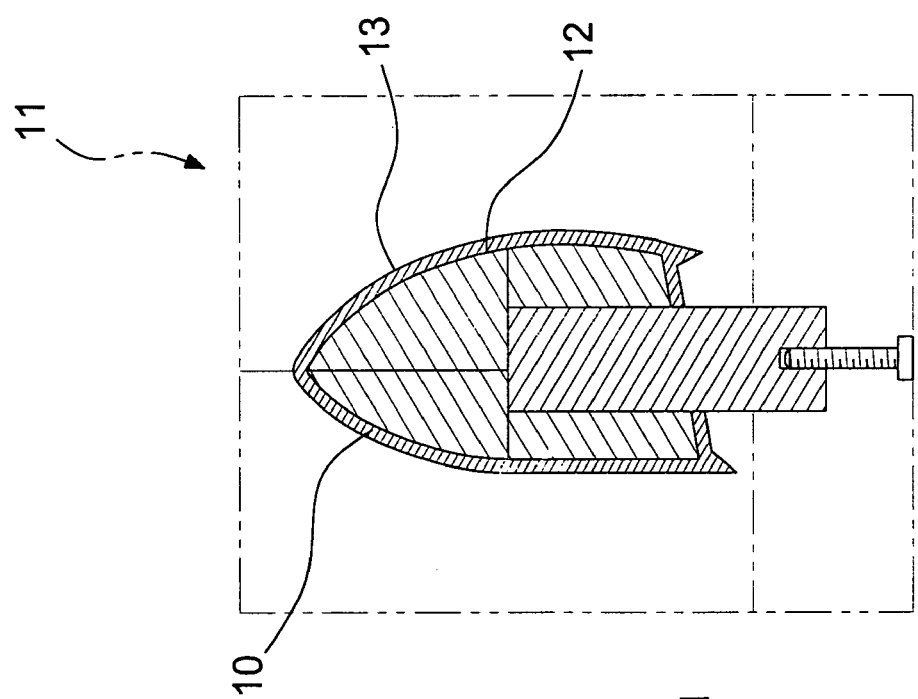
Figure 1A:
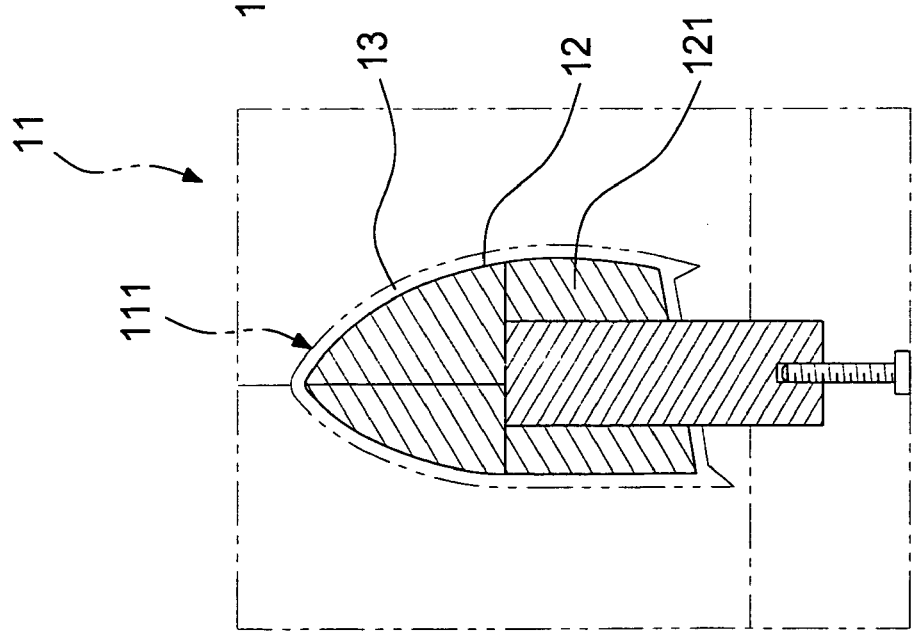

As illustrated in FIG. 1A, a male die assembly (12) being composed of multiple male dies (121) is positioned in a first cavity (111) of a first female die (11). A first gap (13) is defined between the male die assembly (12) and the first female die (11). A first inlet (not shown) is defined in the first female die (11) and in communication with the first gap (13).

As illustrated in FIG. 1B, dissolvable wax is injected into the first gap (13) through the first inlet to form a dissolvable wax mold (10).

As illustrated in FIG. 1C, after the dissolvable wax mold (10) is solidified, the first female die (11) is removed to take out the dissolvable wax mold (10) and the male die assembly (12).

Figure 1D:
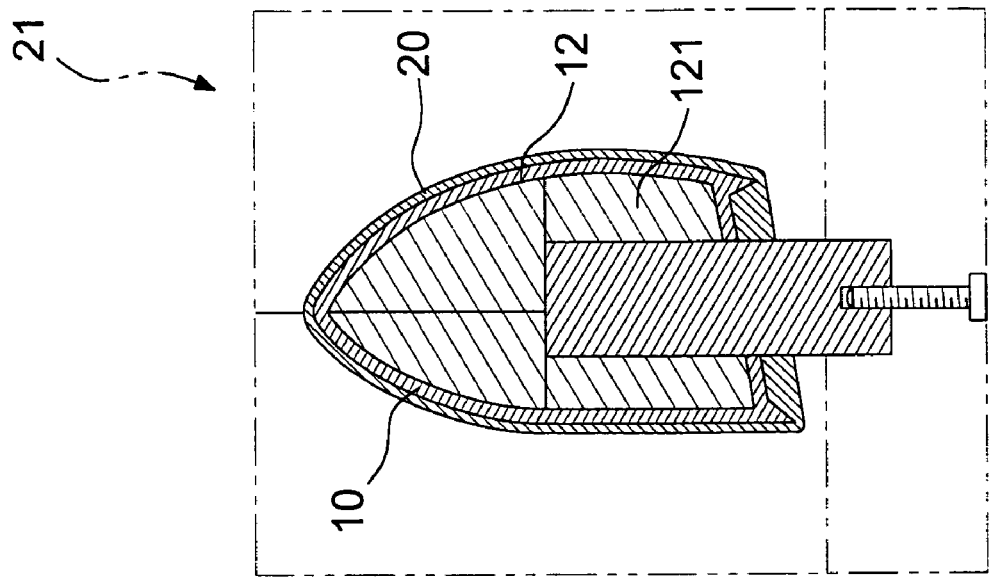

As illustrated in FIG. 1D, a second female die (21) has a second cavity (211) with an inner wall corresponding to a contour of a golf club head. The second female die (21) has a second inlet (not shown) in communication with the second cavity (211). The dissolvable wax mold (10) and the male die assembly (12) are positioned in the second cavity (211), and a second gap (22) is defined between the inner wall of the second cavity (211) and the dissolvable wax mold (10).

Figure 1E:
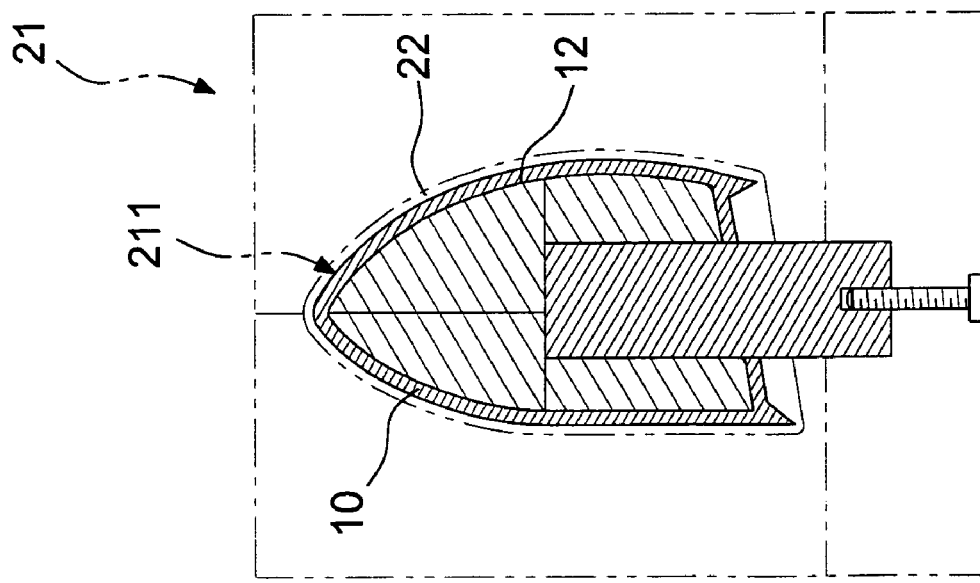

As illustrated in FIG. 1E, wax for precision casting is injected in the second gap (22) through the second inlet to form a wax mold (20) for casting the golf club head.

Figure 1G:
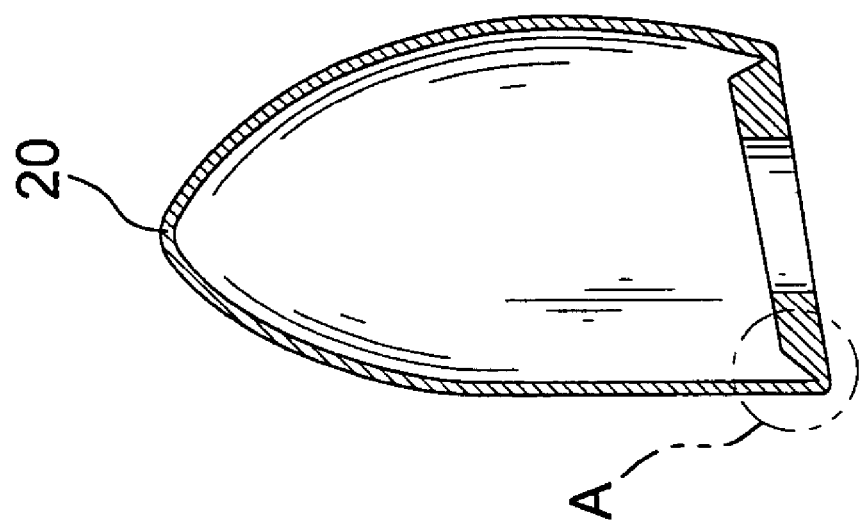
Figure 1F:
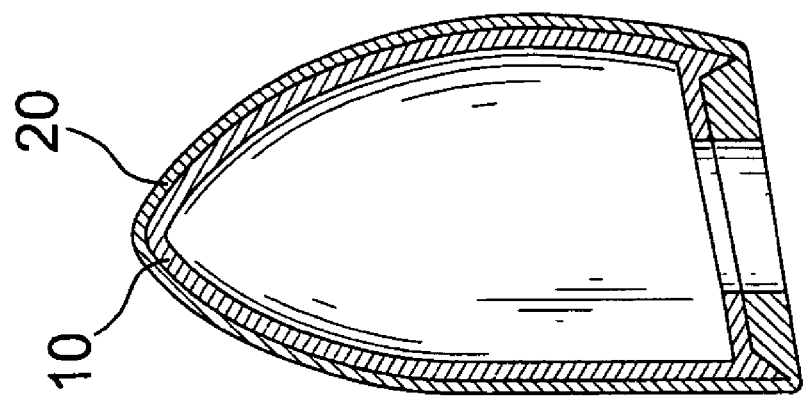

As illustrated in FIG. 1F, the second female die (21) is detached to take out the head wax mold (20) and dissolvable wax mold (10), and the male die assembly (12) is removed from the dissolvable wax mold (10). Thus, the dissolvable wax mold (10) is integrated in the head wax mold (20).

As illustrated in FIG. 1G, solvent is injected in the head wax mold (20) to dissolve the dissolvable wax mold (10). Thus, the head wax mold (20) is finished for casting the golf club head.

The dissolvable wax mold (10) and the head wax mold (20) are made of two types of wax with different dissolvability. For example, the head wax mold (20) is made of acid-dissolvable wax, and the dissolvable wax mold (10) is made of alkaline-dissolvable wax. The solvent injected in the head wax mold (20) is an alkaline solvent, so the dissolvable wax mold (10) can be dissolved.

Because the head wax mold is made by utilizing the dissolvable wax mold, the male die assembly (12) can be composed of few male dies (121). Even if the golf club head has a complex structure, such as a special part (A) in FIG. 1G, it also can be manufactured by using few simple male dies without special pattern drafts designed for the special part (A). Thus, it is very simple and convenient to design and manufacture the wax mold for casting the golf club head. Moreover, because the quantity of the male dies is reduced, the manufacturing cost and time of the golf club head are low and short. Furthermore, the golf club head made will have a high precision, and a production efficiency of the golf club head is high.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for manufacturing a wax mold of a golf club head comprising steps of:

positioning a male die assembly being composed of multiple male dies in a first cavity of a first female die to define a first gap between the male die assembly and an inner wall of the first cavity, the inner wall of the first cavity having a contour corresponding to an inner wall of the golf club head;

injecting dissolvable wax into the first cavity to form a dissolvable wax mold;

cooling and solidifying the dissolvable wax mold;

removing the first female die to take out the solidified dissolvable wax mold;

positioning the dissolvable wax mold and the male die assembly in a second cavity of a second female die to define a second gap between the dissolvable wax mold and an inner wall of the second cavity, the inner wall of the second cavity having a contour corresponding to an outer periphery of the golf club head;

injecting wax for precision casting into the second cavity to form a head wax mold;

cooling and solidifying the head wax mold;

removing the second female die and the male die assembly to take out the solidified head wax mold; and injecting solvent into the head wax mold to dissolve the dissolvable wax mold.

2. The manufacturing method as claimed in claim 1, wherein the dissolvable wax mold is made of acid-dissolvable wax; and the head wax mold is made of alkaline-dissolvable wax.

* * * * *